(12) United States Patent
Murashima

(10) Patent No.: US 11,421,992 B2
(45) Date of Patent: Aug. 23, 2022

(54) PHYSICAL QUANTITY DETECTION CIRCUIT AND PHYSICAL QUANTITY DETECTION DEVICE

(71) Applicant: Seiko Epson Corporation, Toyko (JP)

(72) Inventor: Noriyuki Murashima, Chino (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 17/327,897

(22) Filed: May 24, 2021

(65) Prior Publication Data
US 2021/0364295 A1    Nov. 25, 2021

(30) Foreign Application Priority Data

May 25, 2020  (JP) .............................. JP2020-090419

(51) Int. Cl.
*G01C 19/5776*    (2012.01)

(52) U.S. Cl.
CPC ................. *G01C 19/5776* (2013.01)

(58) Field of Classification Search
CPC ............ G01C 19/5776; G01C 19/5649; G01C 19/5607; G01C 19/5614
See application file for complete search history.

(56) References Cited

U.S. PATENT DOCUMENTS

| 8,099,073 | B1* | 1/2012 | Muller ................. H04B 1/0483 455/341 |
| 2017/0207761 | A1* | 7/2017 | Raman .................... H03F 3/005 |
| 2018/0019717 | A1 | 1/2018 | Murashima |
| 2018/0123524 | A1* | 5/2018 | Polesel ............... H03F 3/45183 |
| 2019/0207622 | A1* | 7/2019 | Tanaka ..................... H03F 3/45 |
| 2020/0240785 | A1* | 7/2020 | Yamada ............. G01C 19/5776 |

FOREIGN PATENT DOCUMENTS

| JP | 2018-009930 A | 1/2018 |
| JP | 2018-166272 A | 10/2018 |

* cited by examiner

*Primary Examiner* — David J Bolduc
(74) *Attorney, Agent, or Firm* — Harness, Dickey & Pierce, P.L.C.

(57) ABSTRACT

A physical quantity detection circuit includes a first chopping circuit to which a first differential signal based on an output signal of a physical quantity detection element is input, an operational amplifier configured to perform differential amplification on a second differential signal input from the first chopping circuit via a first signal path and a second signal path, a second chopping circuit to which a third differential signal based on an output signal of the operational amplifier is input, an analog/digital conversion circuit configured to convert a fourth differential signal based on an output signal of the second chopping circuit into a digital signal, and a capacitance circuit coupled to the first signal path and the second signal path.

4 Claims, 8 Drawing Sheets

PHYSICAL QUANTITY DETECTION CIRCUIT AND PHYSICAL QUANTITY DETECTION DEVICE

The present application is based on, and claims priority from JP Application Serial Number 2020-090419, filed May 25, 2020, the disclosure of which is hereby incorporated by reference herein in its entirety.

BACKGROUND

1. Technical Field

The present disclosure relates to a physical quantity detection circuit and a physical quantity detection device.

2. Related Art

At present, in a variety of systems and electronic apparatuses, there are widely used a variety of physical quantity detection devices capable of detecting a physical quantity such as a gyro sensor for detecting angular velocities and an acceleration sensor for detecting acceleration. In recent years, in particular, in order to construct a system high in reliability, there is used a physical quantity detection device for outputting detection information of a physical quantity as digital data high in noise tolerance.

In JP-A-2018-9930 (Document 1), there is described a physical quantity detection circuit which is provided in the anterior stage of an A/D conversion circuit with an operational amplifier and two chopping circuits respectively disposed in the anterior stage and the posterior stage of the operational amplifier, and which detects a physical quantity based on an output signal from a physical quantity detection element.

However, in the physical quantity detection circuit described in Document 1, although the 1/f noise generated in the operational amplifier is reduced by the chopping actions of the two chopping circuits disposed in the anterior and posterior stages of the operational amplifier, a voltage fluctuation occurs due to the chopping actions, and thus, a sensitivity linearity error increases.

SUMMARY

A physical quantity detection circuit according to an aspect of the present disclosure includes a first chopping circuit to which a first differential signal based on an output signal of a physical quantity detection element is input, an operational amplifier configured to perform differential amplification on a second differential signal input from the first chopping circuit via a first signal path and a second signal path, a second chopping circuit to which a third differential signal based on an output signal of the operational amplifier is input, an analog/digital conversion circuit configured to convert a fourth differential signal based on an output signal of the second chopping circuit into a digital signal, and a capacitance circuit coupled to the first signal path and the second signal path.

A physical quantity detection device according to another aspect of the present disclosure includes the physical quantity detection circuit according to the aspect described above, and the physical quantity detection element.

DESCRIPTION OF EXEMPLARY EMBODIMENTS

Some preferred embodiments of the present disclosure will hereinafter be described in detail using the drawings. It should be noted that the embodiments described below do not unreasonably limit the content of the present disclosure as set forth in the appended claims. Further, all of the constituents described below are not necessarily essential elements of the present disclosure.

The description will hereinafter be presented taking a physical quantity detection device for detecting an angular velocity as a physical quantity, namely an angular velocity detection device, as an example.

1. Physical Quantity Detection Device

1-1. First Embodiment

1-1-1. Configuration of Physical Quantity Detection Device

Figure 1:
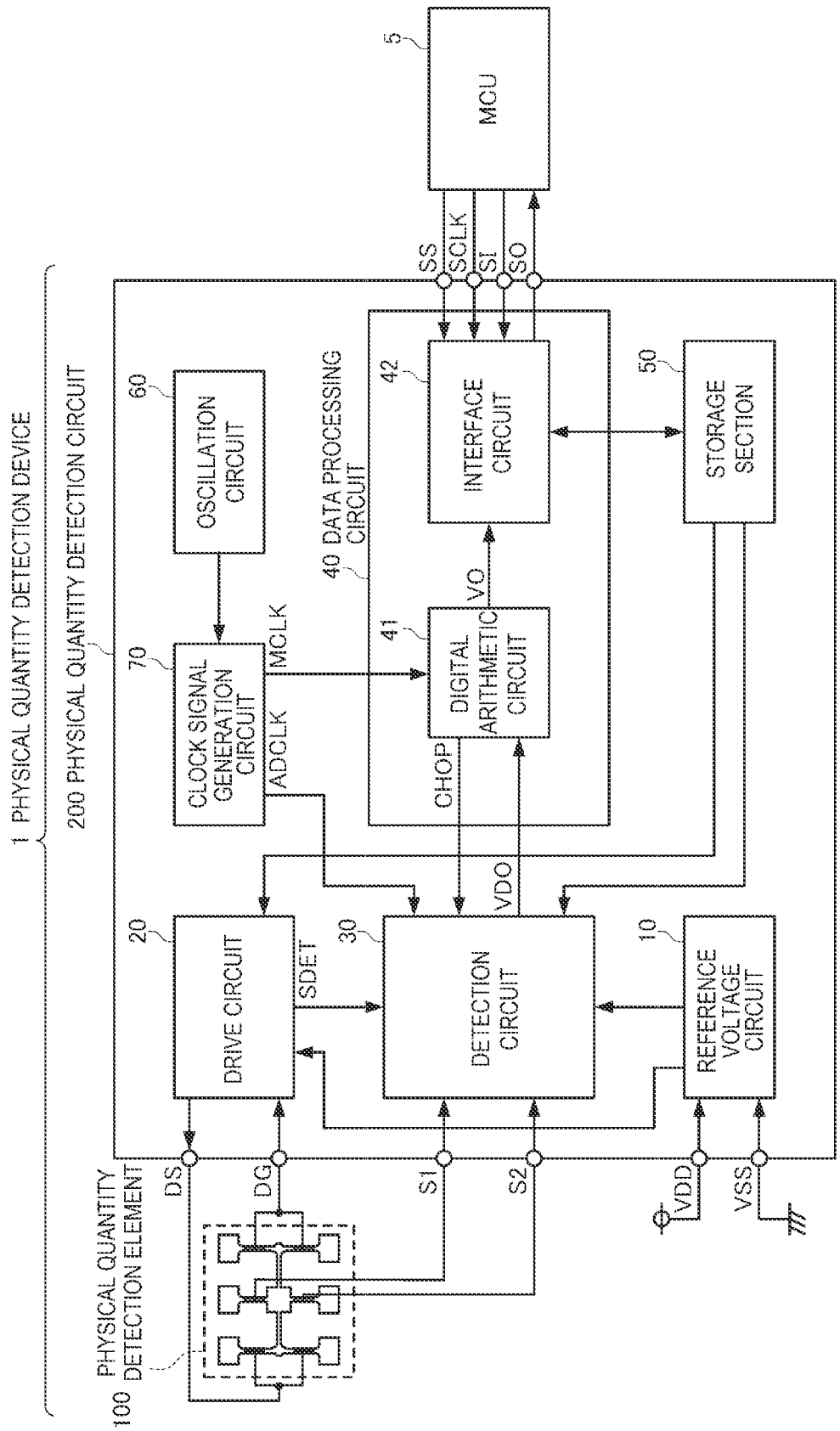
FIG. 1 is a diagram showing a configuration example of a physical quantity detection device according to an embodiment.

FIG. 1 is a functional block diagram of a physical quantity detection device according to the present embodiment. A physical quantity detection device 1 according to the present embodiment is provided with a physical quantity detection element 100 for outputting an analog signal related to a physical quantity, and a physical quantity detection circuit 200.

The physical quantity detection element 100 has a vibrator element provided with drive electrodes and detection electrodes, and in general, in order to make the impedance of the vibrator element as small as possible to increase the oscillation efficiency, the vibrator element is encapsulated in a package in which airtightness is ensured. In the present embodiment, the physical quantity detection element 100 has a so-called double-T type vibrator element having two T-shaped drive vibrating arms.

Figure 2:
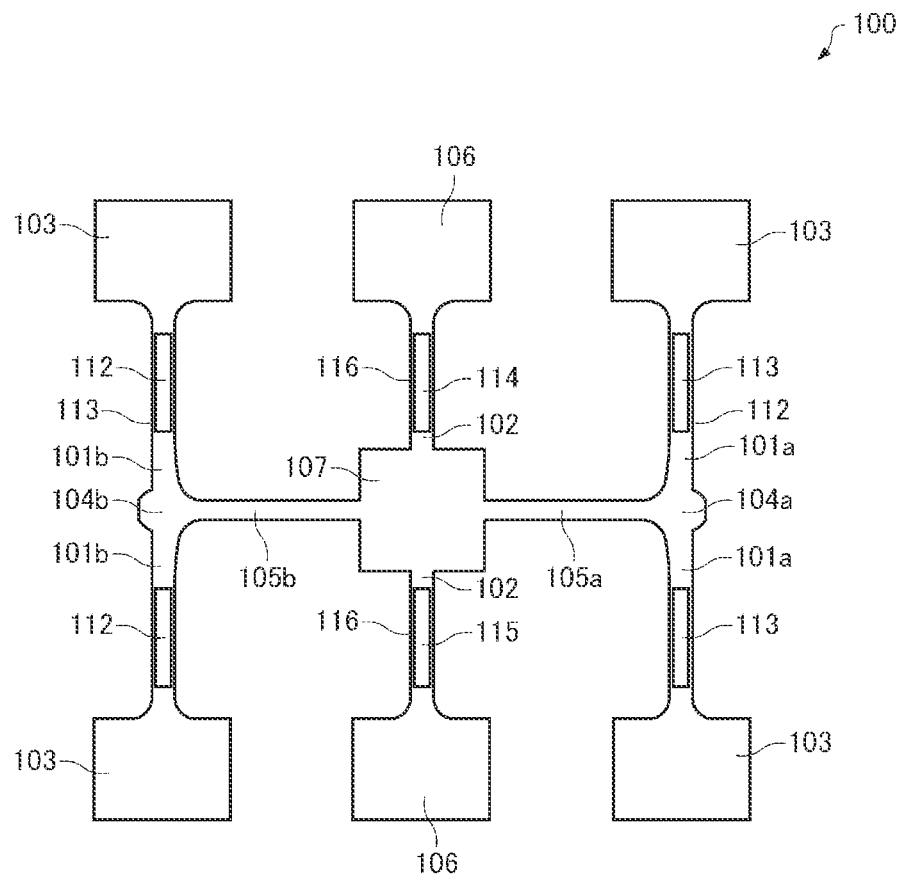
FIG. 2 is a plan view of a vibrator element of a physical quantity detection element.
Figure 2:
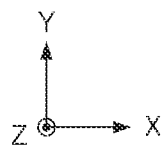

FIG. 2 is a plan view of the vibrator element of the physical quantity detection element 100 in the present embodiment. The physical quantity detection element 100 has the double-T type vibrator element formed of, for example, a Z-cut quartz crystal substrate. The vibrator element using quartz crystal as the material is extremely small in fluctuation of the resonant frequency with respect to a temperature variation, and therefore, has an advantage that it is possible to increase the detection accuracy of the angular velocity. It should be noted that an X axis, a Y axis, and a Z axis in FIG. 2 represent the axes of the quartz crystal.

As shown in FIG. 2, in the vibrator element of the physical quantity detection element 100, drive vibrating arms 101a, 101b extend along the Y axis toward the both sides from two driving base parts 104a, 104b, respectively. Drive electrodes 112 and 113 are respectively formed on a side surface and an upper surface of each of the drive vibrating arms 101a, and the drive electrodes 113 and 112 are respectively formed on a side surface and an upper surface of each of the drive vibrating arms 101b. The drive electrodes 112, 113 are coupled to a drive circuit 20 respectively via a DS terminal and a DG terminal of the physical quantity detection circuit 200 shown in FIG. 1.

The driving base parts 104a, 104b are coupled to a detecting base part 107 having a rectangular shape respectively via coupling arms 105a, 105b extending along the X axis.

Detection vibrating arms 102 extend from the detecting base part 107 along the Y axis toward the both sides. On the upper surfaces of the detection vibrating arms 102, there are respectively formed detection electrodes 114 and 115, and on the side surface of each of the detection vibrating arms 102, there is formed a common electrode 116. The detection electrodes 114, 115 are coupled to a detection circuit 30 respectively via an S1 terminal and an S2 terminal of the physical quantity detection circuit 200 shown in FIG. 1. Further, the common electrode 116 is grounded.

Figure 3:
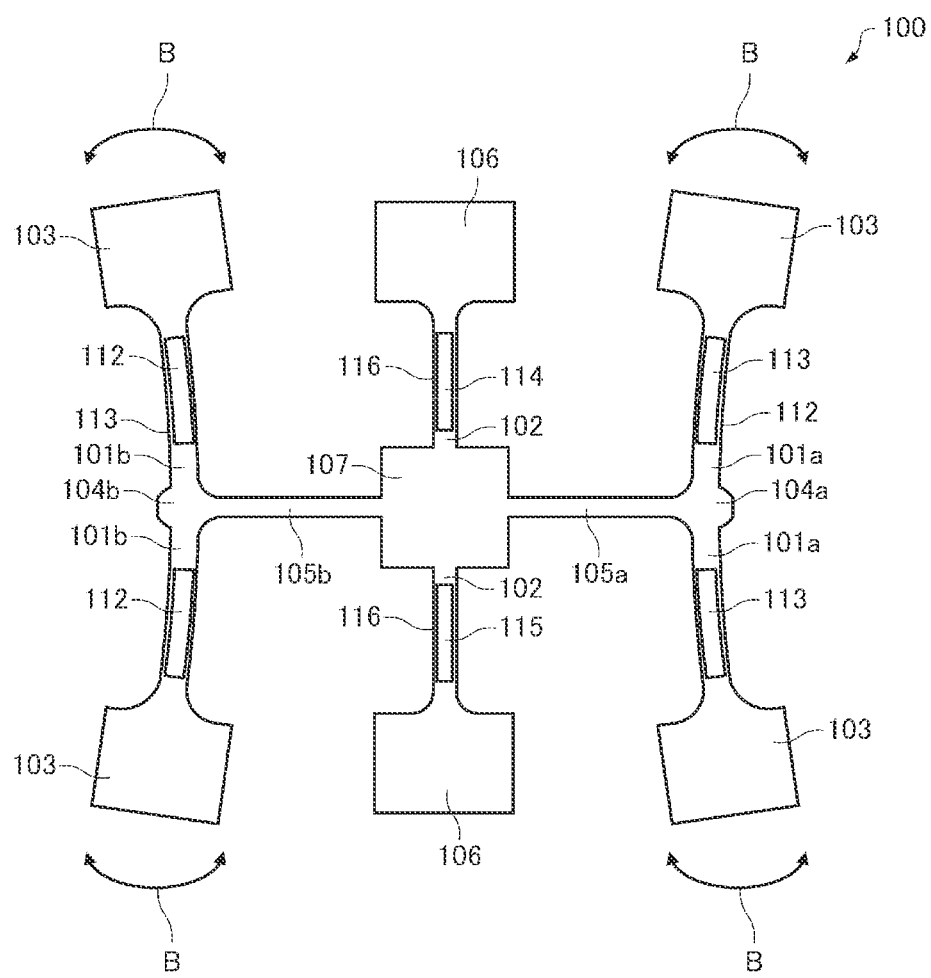
FIG. 3 is a diagram for explaining an action of the physical quantity detection element.

When an AC voltage is applied between the drive electrodes 112 and the drive electrodes 113 of the drive vibrating arms 101a, 101b as a drive signal, the drive vibrating arms 101a, 101b make flexural vibrations in which the tips of the two drive vibrating arms 101a, 101b repeat coming closer to and getting away from each other as indicated by the arrows B due to the inverse piezoelectric effect as shown in FIG. 3. Hereinafter, the flexural vibration of the drive vibrating arms 101a, 101b is also referred to as an "excitation vibration" in some cases.

Figure 4:
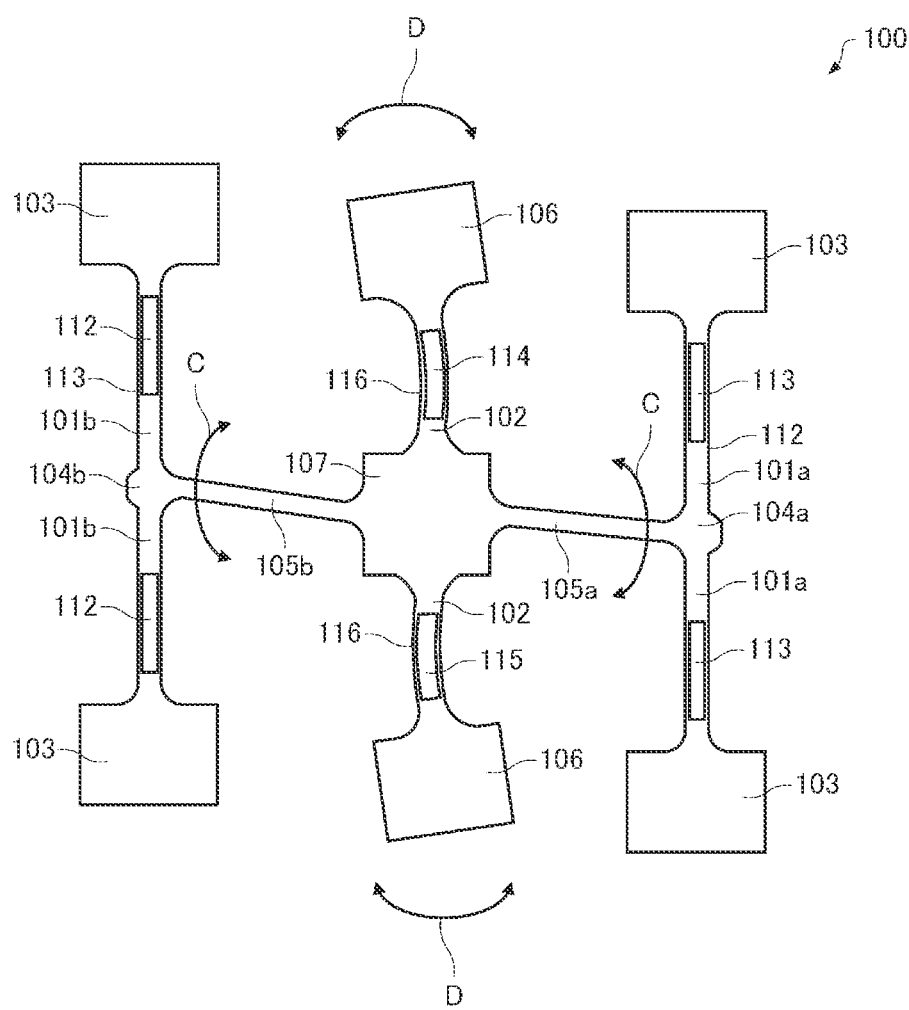
FIG. 4 is a diagram for explaining an action of the physical quantity detection element.

In this state, when an angular velocity around the Z axis as the rotational axis is applied to the vibrator element of the physical quantity detection element 100, the drive vibrating arms 101a, 101b each obtain a Coriolis force in a direction perpendicular to both of a direction of the flexural vibration indicated by the arrow B and the Z axis. As a result, as shown in FIG. 4, the coupling arms 105a, 105b each make a vibration indicated by the arrow C. Then, the detection vibrating arms 102 each make a flexural vibration indicated by the arrow D in tandem with the vibrations of the coupling arms 105a, 105b. The flexural vibrations of the detection vibrating arms 102 due to the Coriolis force and the flexural vibrations of the drive vibrating arms 101a, 101b are shifted in phase as much as 90° from each other.

Incidentally, when the magnitude of the vibration energy or the amplitude of the vibration when the drive vibrating arms 101a, 101b make the flexural vibrations is equal between the two drive vibrating arms 101a, 101b, the balance of the vibration energy between the drive vibrating arms 101a, 101b is achieved, and in the state in which no angular velocity is applied to the physical quantity detection element 100, the detection vibrating arms 102 do not make the flexural vibrations. However, when the balance of the vibration energy between the two drive vibrating arms 101a, 101b is lost, the flexural vibrations occur in the detection vibrating arms 102 even in the state in which no angular velocity is applied to the physical quantity detection element 100. These flexural vibrations are each called a leakage vibration, and are the flexural vibrations indicated by the arrows D similarly to the vibrations based on the Coriolis force, but are the same in phase as the drive signal.

Further, the AC charges based on these flexural vibrations occur in the detection electrodes 114, 115 of the detection vibrating arms 102 due to the piezoelectric effect. Here, the AC charges generated based on the Coriolis force vary in accordance with the magnitude of the Coriolis force, namely the magnitude of the angular velocity applied to the physical quantity detection element 100. In contrast, the AC charges generated based on the leakage vibrations are constant irrespective of the magnitude of the angular velocity applied to the physical quantity detection element 100.

It should be noted that the tips of the drive vibrating arms 101a, 101b are provided with weight parts 103 having a rectangular shape and larger in width than the drive vibrating arms 101a, 101b, respectively. By providing each of the tips of the drive vibrating arms 101a, 101b with the weight part 103, it is possible to increase the Coriolis force, and at the same time, obtain a desired resonant frequency with a relatively short vibrating arm. Similarly, the tip of each of the detection vibrating arms 102 is provided with a weight part 106 larger in width than the detection vibrating arm 102. By providing the tip of each of the detection vibrating arms 102 with the weight part 106, it is possible to increase the AC charges generated in the detection electrodes 114, 115.

In such a manner as described hereinabove, the physical quantity detection element 100 outputs the AC charges based on the Coriolis force with the Z axis as the detection axis, and the AC charges based on the leakage vibration of the excitation vibration via the detection electrodes 114, 115. This physical quantity detection element 100 functions as an inertial sensor for detecting the angular velocity. Hereinafter, the AC charge based on the Coriolis force is referred to as an "angular velocity component," and the AC charge based on the leakage vibration is referred to as a "vibration leakage component" in some cases.

Going back to the description of FIG. 1, the physical quantity detection circuit 200 includes a reference voltage circuit 10, the drive circuit 20, the detection circuit 30, a data processing circuit 40, a storage section 50, an oscillation circuit 60, and a clock signal generation circuit 70. The physical quantity detection circuit 200 can be realized by, for example, a single-chip integrated circuit (IC). It should be noted that the physical quantity detection circuit 200 can be provided with a configuration obtained by omitting or modifying some of these constituents, or adding other constituents.

The reference voltage circuit 10 generates a constant voltage such as a reference voltage as an analog ground voltage and a constant current based on a power supply voltage vdd and a ground voltage gnd respectively supplied through a VDD terminal and a VSS terminal of the physical quantity detection circuit 200, and then supplies them to the drive circuit 20 and the detection circuit 30.

The drive circuit 20 generates a drive signal for making the physical quantity detection element 100 generate the excitation vibration, and supplies the drive signal to the drive electrode 112 of the physical quantity detection element 100 via the DS terminal. Further, an oscillation current generated in the drive electrode 113 due to the excitation vibration of the physical quantity detection element 100 is input to the drive circuit 20 via the DG terminal, and the drive circuit 20 performs feedback control on the amplitude level of the drive signal so that the amplitude of the oscillation current is kept constant. Further, the drive circuit 20 generates a wave detection signal SDET the same in phase as the drive signal, and then outputs the wave detection signal SDET to the detection circuit 30.

The AC charges generated in the two detection electrodes 114, 115 of the physical quantity detection element 100 are input to the detection circuit 30 respectively via the S1 terminal and the S2 terminal of the physical quantity detection circuit 200, and the detection circuit 30 detects an angular velocity component included in these AC charges using the wave detection signal SDET, and then generates and outputs a digital signal VDO having a digital value corresponding to the magnitude of the angular velocity component.

The storage section 50 has a nonvolatile memory not shown, and in the nonvolatile memory, there are stored a variety of types of trimming data such as adjustment data and correction data with respect to the drive circuit 20 and the detection circuit 30. The nonvolatile memory can be constituted as, for example, an MONOS (Metal Oxide Nitride Oxide Silicon) memory or an EEPROM (Electrically Erasable Programmable Read-Only Memory). Further, the storage section 50 has registers not shown, and can be configured so that the variety of types of trimming data stored in the nonvolatile memory are transmitted to and held in the registers when powering on the physical quantity detection circuit 200, namely when the voltage at the VDD terminal rises from 0 V to a desired voltage, and then the variety of types of trimming data held in the registers are supplied to the drive circuit 20 and the detection circuit 30.

The data processing circuit 40 includes a digital arithmetic circuit 41 and an interface circuit 42. The digital arithmetic circuit 41 operates with a master clock signal MCLK. Specifically, the digital arithmetic circuit 41 generates a chopping signal CHOP, and then outputs the chopping signal CHOP to the detection circuit 30. Further, the digital arithmetic circuit 41 performs predetermined arithmetic processing on the digital signal VDO output from the detection circuit 30, and then outputs digital data VO obtained by the arithmetic processing. In the present embodiment, the digital arithmetic circuit 41 performs processing of averaging the digital signal VDO as the predetermined arithmetic processing. It is possible for the digital arithmetic circuit 41 to perform digital filter processing on the digital signal VDO to thereby average the digital signal VDO. In other words, the digital arithmetic circuit 41 functions as an averaging circuit for averaging the digital signal VDO to output the digital data VO.

In accordance with requests from an MCU (Micro Control Unit) 5 as an external device of the physical quantity detection circuit 200, the interface circuit 42 performs processing of retrieving data stored in the nonvolatile memory or the registers of the storage section 50 to output the data to the MCU 5, processing of writing the data input from the MCU 5 into the nonvolatile memory or the registers of the storage section 50, and so on. The interface circuit 42 is, for example, an interface circuit for an SPI (Serial Peripheral Interface) bus, wherein a selection signal, a clock signal, and a data signal transmitted from the MCU 5 are input respectively via an SS terminal, an SCLK terminal, and an SI terminal of the physical quantity detection circuit 200, and the data signal is output to the MCU 5 via an SO terminal of the physical quantity detection circuit 200. It should be noted that the interface circuit 42 can be an interface circuit compatible with a variety of types of bus other than the SPI bus such as an I²C (Inter-Integrated Circuit) bus.

The oscillation circuit 60 generates a source clock signal to output the source clock signal to the clock signal generation circuit 70. The oscillation circuit 60 can be configured as, for example, a ring oscillator or a CR oscillation circuit.

The clock signal generation circuit 70 generates the master clock signal MCLK based on the source clock signal generated by the oscillation circuit 60, and then outputs the master clock signal MCLK to the digital arithmetic circuit 41. Further, the clock signal generation circuit 70 generates a clock signal ADCLK based on the source clock signal generated by the oscillation circuit 60, and then outputs the clock signal ADCLK to the detection circuit 30.

1-1-2. Configuration of Drive Circuit

Figure 5:
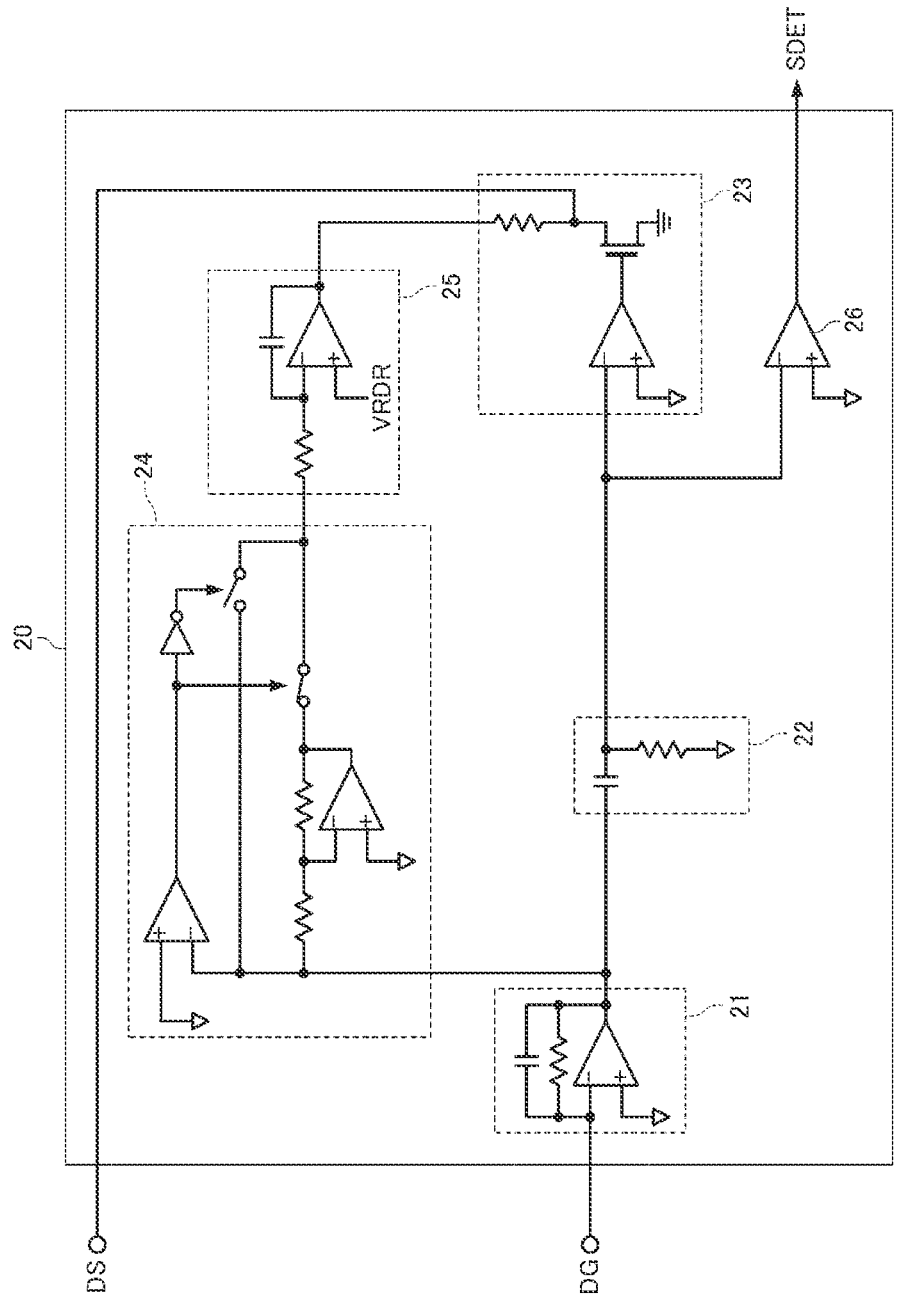
FIG. 5 is a diagram showing a configuration example of a drive circuit.

Then, the drive circuit 20 will be described. FIG. 5 is a diagram showing a configuration example of the drive circuit 20. As shown in FIG. 5, the drive circuit 20 in the present embodiment includes an I/V conversion circuit 21, a high-pass filter 22, a comparator 23, a full-wave rectifier circuit 24, an integrator 25, and a comparator 26. It should be noted that the drive circuit 20 in the present embodiment can be provided with a configuration obtained by eliminating or modifying some of these constituents, or adding other constituents.

The I/V conversion circuit 21 converts the oscillation current, which is generated due to the excitation vibration of the physical quantity detection element 100, and is input via the DG terminal, into an AC voltage signal.

The high-pass filter 22 removes an offset of an output signal of the I/V conversion circuit 21.

The comparator 23 compares the voltage of the output signal of the high-pass filter 22 with the reference voltage to generate a binarized signal. Then, the comparator 23 sets an NMOS transistor to a conductive state to output a low level when the binarized signal is at a high level, and sets the NMOS transistor to a nonconductive state to thereby output an output voltage of the integrator 25 which is pulled up via a resistor as the high level when the binarized signal is at the low level. The output signal of the comparator 23 is supplied as the drive signal to the physical quantity detection element 100 via the DS terminal. By making the frequency of the drive signal coincide with the resonance frequency of the physical quantity detection element 100, it is possible to make the physical quantity detection element 100 oscillate stably.

The full-wave rectifier circuit 24 outputs a signal which is obtained by performing the full-wave rectification on the output signal of the I/V conversion circuit 21 to be a DC signal.

The integrator 25 integrates the output voltage of the full-wave rectifier circuit 24 based on a desired voltage VRDR supplied from the reference voltage circuit 10, and then outputs the result. The higher the output of the full-wave rectifier circuit 24 is, namely the higher the amplitude of the output signal of the I/V conversion circuit 21 is, the lower the output voltage of the integrator 25 becomes. Therefore, the higher the oscillation amplitude is, the lower the voltage at the high level of the drive signal as the output signal of the comparator 23 becomes, and the lower the oscillation amplitude is, the higher the voltage at the high level of the drive signal becomes, and therefore, automatic gain control (AGC; Auto Gain Control) works so that the oscillation amplitude is kept constant.

The comparator 26 amplifies the voltage of the output signal of the high-pass filter 22 to generate a rectangular wave voltage signal as the binarized signal, and outputs the rectangular wave voltage signal as the wave detection signal SDET.

1-1-3. Configuration of Detection Circuit

Figure 6:
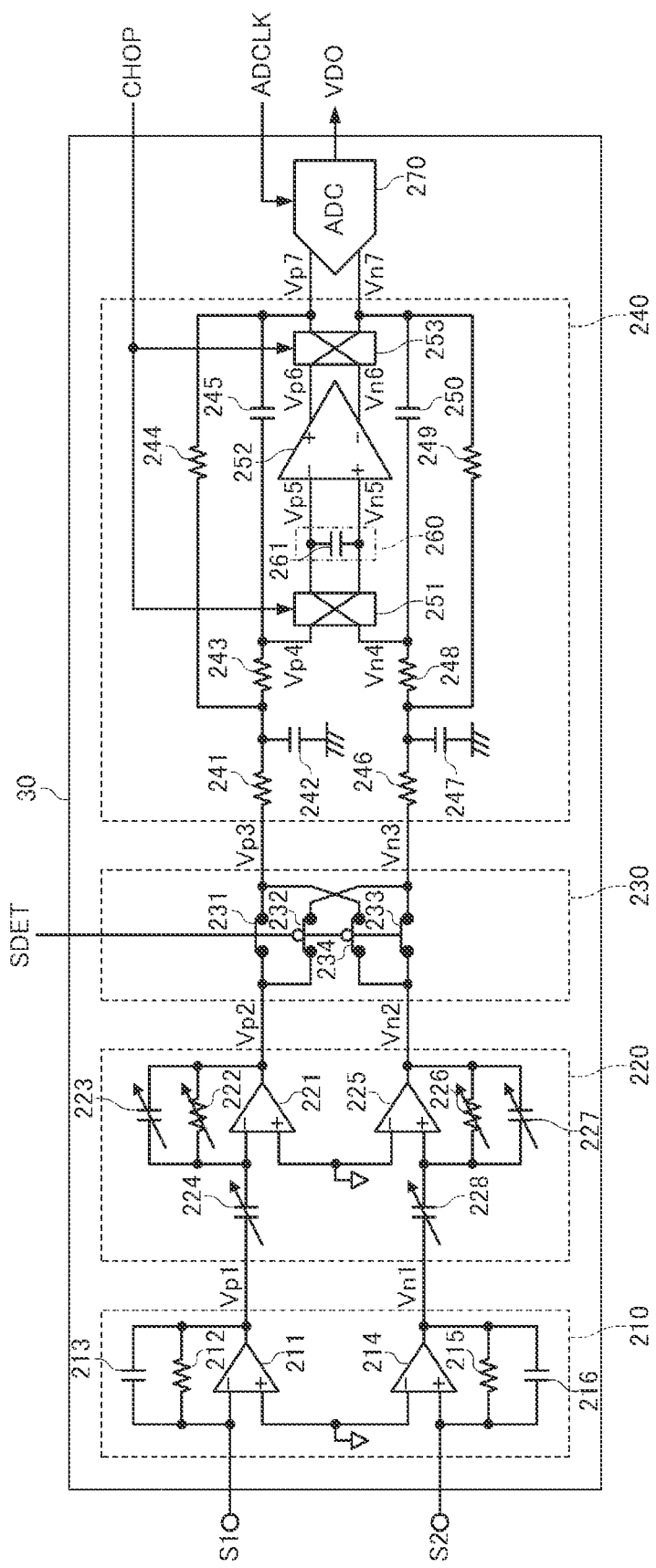
FIG. 6 is a diagram showing a configuration example of a detection circuit.

Then, the detection circuit 30 will be described. FIG. 6 is a diagram showing a configuration example of the detection circuit 30. As shown in FIG. 6, the detection circuit 30 in the present embodiment includes a Q/V conversion circuit 210, a variable gain amplifier 220, a mixer 230, an active filter 240, and an analog/digital conversion circuit 270. It should be noted that the detection circuit 30 in the present embodiment can be provided with a configuration obtained by eliminating or modifying some of these constituents, or adding other constituents.

The Q/V conversion circuit 210 includes an operational amplifier 211, a resistor 212, a capacitor 213, an operational amplifier 214, a resistor 215, and a capacitor 216.

To an inverting input terminal of the operational amplifier 211, there is input an AC charge including the angular velocity component and a vibration leakage component from the detection electrode 114 of the vibrator element of the physical quantity detection element 100 via the S1 terminal. The resistor 212 is a feedback resistor for the operational amplifier 211. Further, the capacitor 213 is a feedback capacitor for the operational amplifier 211. Similarly, to a non-inverting input terminal of the operational amplifier 214, there is input an AC charge including the angular velocity component and a vibration leakage component from the detection electrodes 115 of the vibrator element of the physical quantity detection element 100 via the S2 terminal. The resistor 215 is a feedback resistor for the operational amplifier 214. Further, the capacitor 216 is a feedback capacitor for the operational amplifier 214. The AC charge to be input to the operational amplifier 211 and the AC charge to be input to the operational amplifier 214 are different in phase as much as 180° from each other, and the output signal of the operational amplifier 211 and the output signal of the operational amplifier 214 are opposite in phase to each other. The Q/V conversion circuit 210 configured in such a manner converts the AC charges respectively input from the S1 terminal and the S2 terminal into voltage signals to output differential signals Vp1, Vn1 opposite in phase to each other. In other words, the Q/V conversion circuit 210 functions as a signal conversion circuit which outputs the differential signals Vp1, Vn1 based on the output signal of the physical quantity detection element 100.

The variable gain amplifier 220 includes an operational amplifier 221, a resistor 222, a capacitor 223, a capacitor 224, an operational amplifier 225, a resistor 226, a capacitor 227, and a capacitor 228. The resistors 222, 226 are variable in resistance, and the capacitors 223, 224, 227, and 228 are variable in capacitance.

A signal output from the operational amplifier 211 is input to the operational amplifier 221 via the capacitor 224. The resistor 222 is a feedback resistor for the operational amplifier 221. Further, the capacitor 223 is a feedback capacitor for the operational amplifier 221. Similarly, a signal output from the operational amplifier 214 is input to the operational amplifier 225 via the capacitor 228. The resistor 226 is a feedback resistor for the operational amplifier 225. Further, the capacitor 227 is a feedback capacitor for the operational amplifier 225. The variable gain amplifier 220 configured in such a manner amplifies the differential signals Vp1, Vn1 output from the Q/V conversion circuit 210 to output differential signals Vp2, Vn2 at desired voltage levels.

The mixer 230 includes a switch 231, a switch 232, a switch 233, and a switch 234.

The switches 231, 233 make conductive when the wave detection signal SDET output by the drive circuit 20 is at the high level, and make nonconductive when the wave detection signal SDET is at the low level. Further, the switches 232, 234 make conductive when the wave detection signal SDET is at the low level, and make nonconductive when the wave detection signal SDET is at the high level. The mixer 230 outputs the differential signals Vp2, Vn2 output from the variable gain amplifier 220 without modification when the wave detection signal SDET is at the high level, and outputs signals obtained by inverting the polarities of the differential signals Vp2, Vn2 when the wave detection signal SDET is at the low level. The mixer 230 configured in such a manner functions as a wave detector circuit which detects the differential signals Vp2, Vn2 output from the variable gain amplifier 220 using the wave detection signal SDET to output differential signals Vp3, Vn3 including the angular velocity component. The differential signals Vp3, Vn3 output by the mixer 230 are signals at the voltage levels corresponding to the angular velocity applied to the physical quantity detection element 100.

To the active filter 240, there are input the differential signals Vp3, Vn3 based on the differential signals Vp1, Vn1. The active filter 240 includes a resistor 241, a capacitor 242, a resistor 243, a resistor 244, a capacitor 245, a resistor 246, a capacitor 247, a resistor 248, a resistor 249, a capacitor 250, a first chopping circuit 251, an operational amplifier 252, a second chopping circuit 253, and a capacitance circuit 260. One end of the resistor 241, one end of the capacitor 242, one end of the resistor 243, and one end of the resistor 244 are coupled to each other. Further, one end of the resistor 246, one end of the capacitor 247, one end of the resistor 248, and one end of the resistor 249 are coupled to each other. To the other end of the resistor 241 and the other end of the resistor 246, there are input the differential signals Vp3, Vn3 output from the mixer 230. The other end of the capacitor 242 and the other end of the capacitor 247 are grounded.

The other end of the resistor 243, one end of the capacitor 245, and a first input terminal of the first chopping circuit 251 are coupled to each other, and the other end of the resistor 244, the other end of the capacitor 245, and a first output terminal of the second chopping circuit 253 are coupled to each other. Further, the other end of the resistor 248, one end of the capacitor 250, and a second input terminal of the first chopping circuit 251 are coupled to each other, and the other end of the resistor 249, the other end of the capacitor 250, and a second output terminal of the second chopping circuit 253 are coupled to each other.

The first chopping circuit 251 is disposed in a signal path between the Q/V conversion circuit 210 and the operational amplifier 252, specifically in a signal path between the mixer 230 and the operational amplifier 252, and differential signals Vp4, Vn4 based on the output signal of the physical quantity detection element 100 are input to the first chopping circuit 251. One signal Vp4 of the differential signals Vp4, Vn4 based on the differential signals Vp3, Vn3 output from the mixer 230 is input to the first input terminal of the first chopping circuit 251 via the resistors 241, 243, and the other signal Vn4 of the differential signals Vp4, Vn4 based on the differential signals Vp3, Vn3 output from the mixer 230 is input to the second input terminal of the first chopping circuit 251 via the resistors 246, 248. Further, the first chopping circuit 251 outputs one of the two signals input to the first input terminal and the second input terminal from a first output terminal, and outputs the other thereof from a second output terminal based on the chopping signal CHOP.

In the present embodiment, the first chopping circuit 251 outputs the signal input to the first input terminal from the first output terminal, and outputs the signal input to the second input terminal from the second output terminal when the chopping signal CHOP is at the low level. Further, the first chopping circuit 251 outputs the signal input to the first input terminal from the second output terminal, and outputs the signal input to the second input terminal from the first output terminal when the chopping signal CHOP is at the high level. Therefore, by the chopping signal CHOP periodically repeating the low level and the high level, the signal component around a DC component included in the differential signals Vp4, Vn4 input to the first chopping circuit 251 is converted by the first chopping circuit 251 into a signal component around a chopping frequency fch as the frequency of the chopping signal CHOP.

An inverting input terminal of the operational amplifier 252 is coupled to the first output terminal of the first chopping circuit 251, and a non-inverting input terminal of the operational amplifier 252 is coupled to the second output terminal of the first chopping circuit 251. In other words, the signal path between the first chopping circuit 251 and the operational amplifier 252 has a first signal path and a second signal path. The first signal path is a signal path from the first output terminal of the first chopping circuit 251 to the inverting input terminal of the operational amplifier 252, and the second signal path is a signal path from the second output terminal of the first chopping circuit 251 to the non-inverting input terminal of the operational amplifier 252. Further, the operational amplifier 252 performs differential amplification of differential signals Vp5, Vn5 input from the first chopping circuit 251 via the first signal path and the second signal path.

The second chopping circuit 253 is disposed in a signal path between the operational amplifier 252 and the analog/digital conversion circuit 270. A first input terminal of the second chopping circuit 253 is coupled to a non-inverted output terminal of the operational amplifier 252, a second input terminal of the second chopping circuit 253 is coupled to an inverted output terminal of the operational amplifier 252, and thus, differential signals Vp6, Vn6 based on the output signal of the operational amplifier 252 are input to the second chopping circuit 253. To the first input terminal of the second chopping circuit 253, there is input one signal Vp6 of the differential signals Vp6, Vn6 output from the operational amplifier 252, and to the second input terminal of the second chopping circuit 253, there is input the other signal Vn6 of the differential signals Vp6, Vn6 output from the operational amplifier 252. Further, the second chopping circuit 253 outputs one of the two signals input to the first input terminal and the second input terminal from a first output terminal, and outputs the other thereof from a second output terminal based on the chopping signal CHOP.

In the present embodiment, the second chopping circuit 253 outputs the signal input to the first input terminal from the first output terminal, and outputs the signal input to the second input terminal from the second output terminal when the chopping signal CHOP is at the low level. Further, the second chopping circuit 253 outputs the signal input to the first input terminal from the second output terminal, and outputs the signal input to the second input terminal from the first output terminal when the chopping signal CHOP is at the high level. Therefore, by the chopping signal CHOP periodically repeating the low level and the high level, the signal component around the chopping frequency fch included in the differential signals Vp6, Vn6 input to the second chopping circuit 253 is converted into a signal component around the DC component. Further, the signal component around the DC component included in the differential signals Vp6, Vn6 is converted by the second chopping circuit 253 into the signal component around the chopping frequency fch. As a result, in the output signal of the second chopping circuit 253, the 1/f noise generated in the operational amplifier 252 is effectively reduced.

A first input terminal of the analog/digital conversion circuit 270 is coupled to the first output terminal of the second chopping circuit 253, and a second input terminal of the analog/digital conversion circuit 270 is coupled to the second output terminal of the second chopping circuit 253. Further, the analog/digital conversion circuit 270 converts an output signal of the active filter 240, namely differential signals Vp7, Vn7 based on the output signal of the second chopping circuit 253, into the digital signal VDO. Specifically, the analog/digital conversion circuit 270 samples the differential signals Vp7, Vn7 in input capacitances not shown based on the clock signal ADCLK to thereby convert the differential signals Vp7, Vn7 into the digital signal VDO. As the analog/digital conversion circuit 270, there can be applied a variety of types of analog/digital conversion circuit such as a successive-approximation type, a resistance ladder type, and a delta-sigma type.

Incidentally, the differential signals Vp5, Vn5 periodically flip in polarity with reference to a predetermined voltage due to the chopping action of the first chopping circuit 251, wherein the higher an overshoot or an undershoot occurring when the polarity flips is, the longer the time in which a voltage fluctuation called ringing lasts subsequently becomes. Further, when ringing occurs in the differential signals Vp5, Vn5, substantially the same ringing occurs also in the differential signals Vp7, Vn7 generated based on the differential signals Vp5, Vn5. When the ringing occurs in the differential signals Vp7, Vn7 at the sampling timing of the analog/digital conversion circuit 270, the digital signal VDO includes the error caused by the ringing as a result, and therefore, the sensitivity linearity error increases. To cope with the above, it is possible to reduce the influence of the ringing by setting the sampling timing of the analog/digital conversion circuit 270 immediately before the polarities of the differential signals Vp5, Vn5 flip, but when the specification for the sensitivity linearity is tough, it is difficult to fulfill the specification. Therefore, in the present embodiment, in order to reduce the overshoot occurring when the polarities of the differential signals Vp5, Vn5 flip to thereby converge the ringing caused by the overshoot in a short time, the active filter 240 is provided with the capacitance circuit 260 coupled to the first signal path and the second signal path. Specifically, the capacitance circuit 260 is provided with a capacitive element 261, wherein one end of the capacitive element 261 is coupled to the first signal path, and the other end of the capacitive element 261 is coupled to the second signal path. The capacitive element 261 is, for example, a capacitor.

It should be noted that the differential signals Vp4, Vn4 are an example of a "first differential signal." Further, the differential signals Vp5, Vn5 are an example of a "second differential signal." Further, the differential signals Vp6, Vn6 are an example of a "third differential signal." Further, the differential signals Vp7, Vn7 are an example of a "fourth differential signal."

Figure 7:
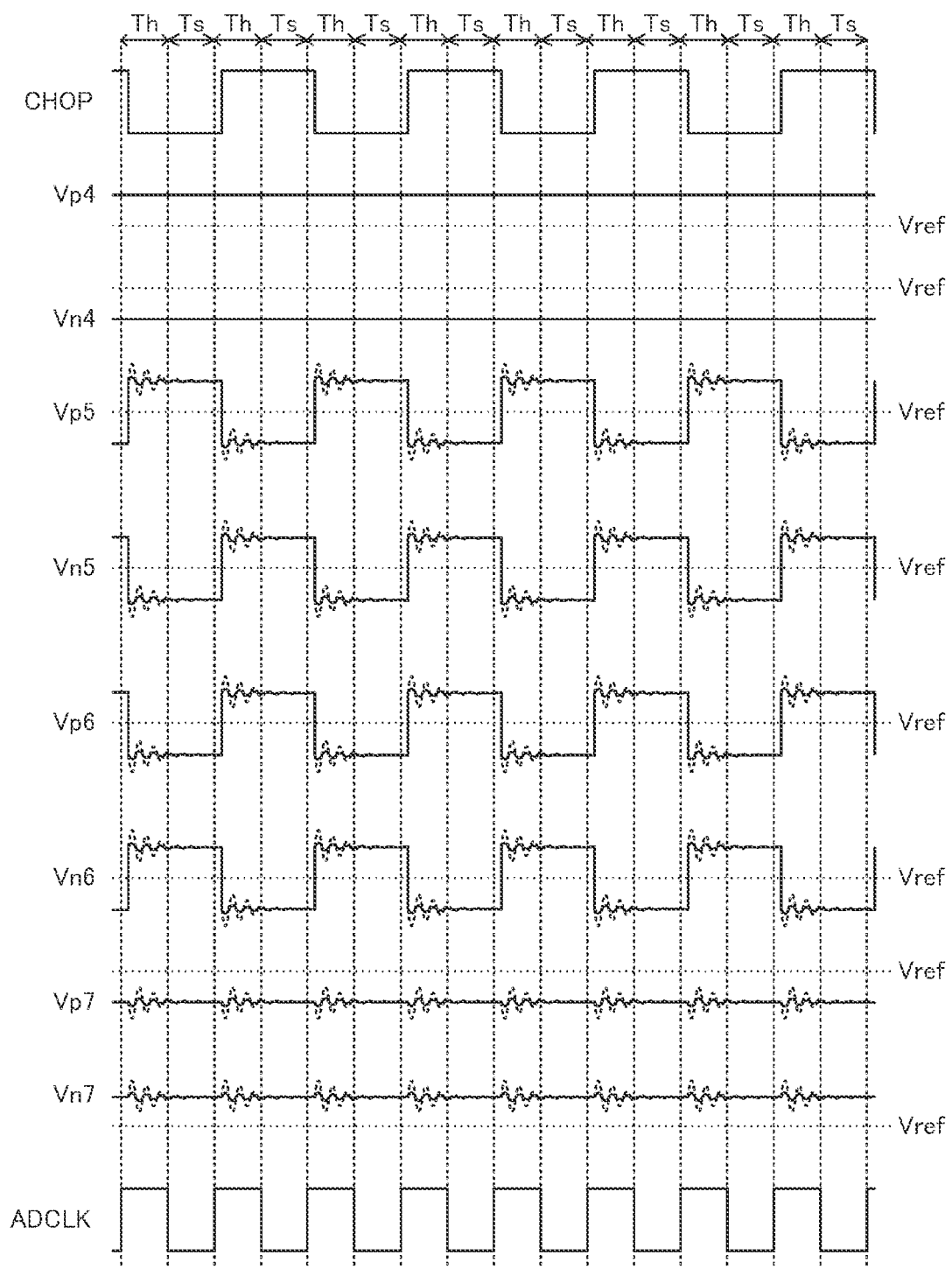
FIG. 7 is a diagram showing an example of waveforms of a variety of signals.

FIG. 7 is a diagram showing an example of waveforms of a variety of signals. In the example shown in FIG. 7, the analog/digital conversion circuit 270 samples and holds the differential signals Vp7, Vn7 at the timing of a rising edge at which the clock signal ADCLK changes from the low level to the high level, and then converts the differential signals Vp7, Vn7 thus held into the digital signal VDO. In other words, the period in which the clock signal ADCLK is at the low level corresponds to a sampling time Ts, and the period in which the clock signal ADCLK is at the high level corresponds to a holding time Th. Further, in the example shown in FIG. 7, the timing of each of the rising edges of the clock signal ADCLK is set so as to be a timing immediately before a rising edge at which the chopping signal CHOP changes from the low level to the high level, or a timing immediately before a falling edge at which the chopping signal CHOP changes from the high level to the low level. In other words, the relationship between the chopping frequency fch as the frequency of the chopping signal CHOP and the sampling frequency fs as the frequency of the clock signal ADCLK is fch=fs/2.

In the example shown in FIG. 7, the signal Vp4 out of the differential signals Vp4, Vn4 is a signal with a constant voltage higher than a predetermined voltage Vref, and the signal Vn4 is a signal with a constant voltage lower than the voltage Vref. The differential signals Vp5, Vn5 are signals the same as the differential signals Vp4, Vn4 in the period in which the chopping signal CHOP is at the low level, and are signals obtained by flipping the polarities of the differential signals Vp4, Vn4 with reference to the voltage Vref in the period in which the chopping signal CHOP is at the high level. The differential signals Vp6, Vn6 are signals obtained by flipping the polarities of the differential signals Vp5, Vn5 with reference to the voltage Vref. The differential signals Vp7, Vn7 are signals the same as the differential signals Vp6, Vn6 in the period in which the chopping signal CHOP is at the low level, and are signals obtained by flipping the polarities of the differential signals Vp6, Vn6 with reference to the voltage Vref in the period in which the chopping signal CHOP is at the high level.

When supposedly the capacitance circuit 260 does not exist, a significant overshoot and a significant undershoot occur in the differential signals Vp5, Vn5 as represented by the dotted lines, and the ringing generated immediately after the polarity flips in the differential signals Vp5, Vn5 for a long time propagates also to the differential signals Vp6, Vn6 and the differential signals Vp7, Vn7. Therefore, the analog/digital conversion circuit 270 is significantly affected by the ringing when sampling the differential signals Vp7, Vn7 as a result, and the error in the digital signal VDO obtained by the analog/digital conversion circuit 270 converting the differential signals Vp7, Vn7 increases. As a result, the sensitivity linearity error increases.

In reality, since the capacitance circuit 260 exists, the overshoot and the undershoot occurring in the differential signals Vp5, Vn5 are reduced, and the ringing which occurs in the differential signals Vp5, Vn5, the differential signals Vp6, Vn6, and the differential signals Vp7, Vn7 is converged in a short time as represented by the solid lines. Therefore, the analog/digital conversion circuit 270 is hardly affected by the ringing when sampling the differential signals Vp7, Vn7, the error in the digital signal VDO decreases, and the sensitivity linearity error is reduced.

Figure 8:
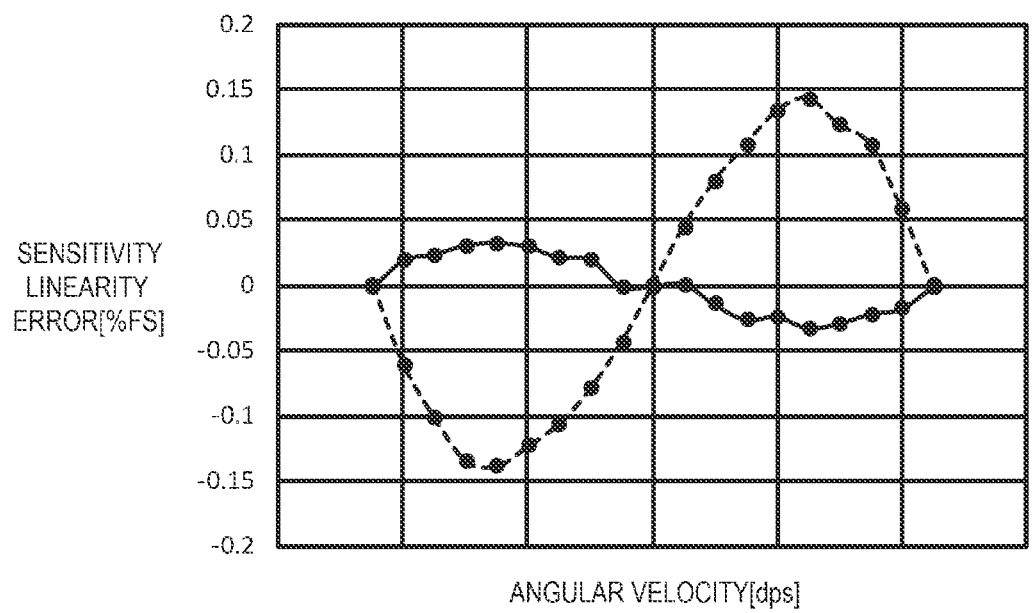
FIG. 8 is a diagram showing a simulation result of a sensitivity linearity error.

FIG. 8 is a diagram showing a simulation result of the sensitivity linearity error. In FIG. 8, the solid line represents the sensitivity linearity error of the physical quantity detection device 1 according to the present embodiment, and the dotted line represents the sensitivity linearity error of the physical quantity detection device according to a comparative example in which the capacitance circuit 260 does not exist. As shown in FIG. 8, assuming the full scale as 100%, while the sensitivity linearity error of the physical quantity detection device according to the comparative example is in a range of about ±0.15%, the sensitivity linearity error of the physical quantity detection device 1 according to the present embodiment falls within a range narrower than ±0.05%. As described above, the physical quantity detection device 1 according to the present embodiment is provided with the capacitance circuit 260, and thus, the sensitivity linearity error is reduced.

1-1-4. Functions and Advantages

In the physical quantity detection device 1 according to the first embodiment described hereinabove, in the physical quantity detection circuit 200, the active filter 240 is provided with the first chopping circuit 251 to which the differential signals Vp4, Vn4 based on the output signal of the physical quantity detection element 100 are input, the operational amplifier 252 which performs the differential amplification on the differential signals Vp5, Vn5 input from the first chopping circuit 251 via the first signal path and the second signal path, the second chopping circuit 253 to which the differential signals Vp6, Vn6 based on the output signal of the operational amplifier 252 are input, and the capacitance circuit 260 coupled to the first signal path and the second signal path. Further, the physical quantity detection circuit 200 is provided with the analog/digital conversion circuit 200 for converting the differential signals Vp7, Vn7 based on the output signal of the second chopping circuit 253 into the digital signal VDO.

Therefore, the active filter 240 disposed in the anterior stage of the analog/digital conversion circuit 270 functions as an anti-aliasing filter, and the high-frequency noise is reduced by being folded back to the signal band due to the sampling by the analog/digital conversion circuit 270.

Further, the signal component around the DC component included in the differential signals Vp4, Vn4 input to the first chopping circuit 251 is converted by the first chopping circuit 251 into the signal component around the chopping frequency fch. Further, the signal component around the chopping frequency fch included in the differential signals Vp6, Vn6 input to the second chopping circuit 253 is converted into the signal component around the DC component. Further, the signal component around the DC component included in the differential signals Vp6, Vn6 is converted by the second chopping circuit 253 into the signal component around the chopping frequency fch. As a result, in the output signal of the second chopping circuit 253, the 1/f noise generated in the operational amplifier 252 is effectively reduced.

Further, it is possible for the capacitance circuit 260 to reduce the overshoot which occurs when the polarities of the differential signals Vp5, Vn5 flip due to the chopping action of the first chopping circuit 251, and thus, it is possible to converge the ringing caused by the overshoot in a short time. Therefore, the analog/digital conversion circuit 270 is hardly affected by the ringing when sampling the differential signals Vp7, Vn7, the error in the digital signal VDO decreases, and the sensitivity linearity error is reduced.

Therefore, according to the physical quantity detection device 1 related to the first embodiment, it is possible to reduce the 1/f noise generated by the operation of the operational amplifier 252, and at the same time, reduce the sensitivity linearity error in the physical quantity detection circuit 200.

Further, in the physical quantity detection device 1 according to the first embodiment, the capacitance circuit 260 is provided with the capacitive element 261, wherein one end of the capacitive element 261 is coupled to the first signal path, and the other end of the capacitive element 261 is coupled to the second signal path.

Therefore, the ringing occurring in the signal Vp5 propagating through the first signal path and the ringing occurring in the signal Vn5 propagating through the second signal path which are at least partially reversed in phase from each other are canceled out by the capacitive element 261, and thus, it is possible to converge the ringing in a shorter time. As a result, according to the physical quantity detection device 1 related to the first embodiment, in the physical quantity detection circuit 200, the sensitivity linearity error is reduced, or it is possible to widen the signal band by increasing the sampling frequency of the analog/digital conversion circuit 270.

1-2. Second Embodiment

The physical quantity detection device 1 according to a second embodiment is different in the configuration of the capacitance circuit 260 provided to the active filter 240 from the physical quantity detection device 1 according to the first embodiment. Hereinafter, regarding the physical quantity detection device 1 according to the second embodiment, substantially the same constituents as those in the first embodiment will be denoted by the same reference numerals, and different contents from those in the first embodiment are mainly described while omitting or simplifying the description duplicated with the first embodiment.

Figure 9:
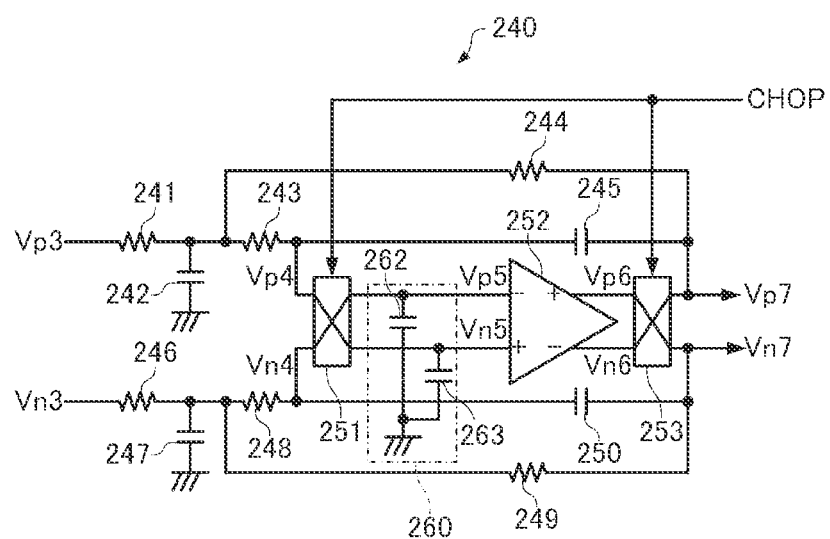
FIG. 9 is a diagram showing a configuration example of an active filter in a second embodiment.

FIG. 9 is a diagram showing a configuration example of the active filter 240 in the physical quantity detection device 1 according to the second embodiment. In FIG. 9, substantially the same constituents as those shown in FIG. 6 are denoted by the same reference numerals. As shown in FIG. 9, the active filter 240 is provided with the capacitance circuit 260 coupled to the first signal path and the second signal path. As described above, the first signal path is the signal path from the first output terminal of the first chopping circuit 251 to the inverting input terminal of the operational amplifier 252, and the second signal path is the signal path from the second output terminal of the first chopping circuit 251 to the non-inverting input terminal of the operational amplifier 252.

The capacitance circuit 260 is provided with a first capacitive element 262 and a second capacitive element 263. The first capacitive element 262 is coupled to the first signal path in one end, and is supplied with a constant voltage in the other end, and the second capacitive element 263 is coupled to the second signal path in one end, and is supplied with the constant voltage in the other end. The first capacitive element 262 and the second capacitive element 263 are, for example, capacitors. In the example shown in FIG. 9, the constant voltage commonly supplied to the other end of the first capacitive element 262 and the other end of the second capacitive element 263 is the ground voltage gnd supplied from the VSS terminal. It should be noted that the constant voltage can be the power supply voltage vdd supplied from the VDD terminal, or can also be another voltage.

The rest of the configuration of the active filter 240 is substantially the same as shown in FIG. 6, and therefore, the description thereof will be omitted. Further, the rest of the configuration of the physical quantity detection device 1 according to the second embodiment is substantially the same as shown in FIG. 1, and therefore, the illustration and the description thereof will be omitted.

According to the physical quantity detection device 1 related to the second embodiment described hereinabove, it is possible to reduce the 1/f noise generated by the operation of the operational amplifier 252, and at the same time, reduce the sensitivity linearity error in the physical quantity detection circuit 200 similarly to the physical quantity detection device 1 according to the first embodiment.

Further, in the physical quantity detection device 1 according to the second embodiment, the capacitance circuit 260 is provided with the first capacitive element 262 and the second capacitive element 263, the first capacitive element 262 is coupled to the first signal path in one end and is supplied with the constant voltage in the other end, and the second capacitive element 263 is coupled to the second signal path in one end and is supplied with the constant voltage in the other end.

Therefore, the ringing occurring in the signal Vp5 propagating through the first signal path and the ringing occurring in the signal Vn5 propagating through the second signal path which are at least partially reversed in phase from each other are canceled out by the first capacitive element 262 and the second capacitive element 263, and thus, it is possible to converge the ringing in a shorter time. As a result, according to the physical quantity detection device 1 related to the second embodiment, in the physical quantity detection circuit 200, the sensitivity linearity error is reduced, or it is possible to widen the signal band by increasing the sampling frequency of the analog/digital conversion circuit 270.

1-3. Modified Examples

Although in each of the embodiments described above, the digital arithmetic circuit 41 averages the digital signal VDO to generate the digital data VO, it is possible for the physical quantity detection device 1 to output the digital signal VDO, and for the external device such as the MCU 5 to average the digital signal VDO to generate the digital data VO.

Further, although in each of the embodiments described above, the angular velocity sensor including the physical quantity detection element 100 for detecting the angular velocity is cited as an example of the physical quantity detection device 1, the physical quantity to be detected by the physical quantity detection element 100 is not limited to the angular velocity, but can also be angular acceleration, acceleration, velocity, force, and so on. Further, the vibrator element in the physical quantity detection element 100 is not required to be the double-T type, but can also be, for example, a tuning fork type, or a comb-tooth type, or can also be a tuning bar type having a shape such as a triangular prism, a quadrangular prism, or a circular cylindrical shape. Further, as the material of the vibrator element of the physical quantity detection element 100, it is also possible to use a piezoelectric material such as a piezoelectric single crystal such as lithium tantalate ($LiTaO_3$) or lithium niobate ($LiNbO_3$), or a piezoelectric ceramics such as lead zirconate titanate (PZT), or to use a silicon semiconductor instead of quartz crystal ($SiO_2$). Further, it is also possible for the vibrator element in the physical quantity detection element 100 to be provided with a structure in which a piezoelectric thin film such as zinc oxide (ZnO) or aluminum nitride (AlN) sandwiched by drive electrodes is disposed in, for example, a part of the surface of the silicon semiconductor. Further, the physical quantity detection element 100 is not limited to the piezoelectric type element, but can also be an element of an electrodynamic type, a capacitance type, an eddy-current type, an optical type, or a vibration type such as a strain gauge type. For example, the physical quantity detection element 100 can also be an MEMS (Micro Electro Mechanical Systems) vibrator of the capacitance type. Further, the detection type of the physical quantity detection element 100 is not limited to the vibration type, but can also be, for example, an optical type, a rotary type, or a fluid type.

Further, although in each of the embodiments described above, the single-axis sensor provided with a single physical quantity detection element 100 is cited as an example of the physical quantity detection device 1, the physical quantity detection device 1 can also be a multiaxial sensor provided with a plurality of physical quantity detection elements 100. For example, the physical quantity detection device 1 can be a three-axis gyro sensor provided with three physical quantity detection elements for detecting angular velocities around three axes different from each other, or can also be a composite sensor provided with the physical quantity detection element for detecting the angular velocity and the physical quantity detection element for detecting the acceleration.

The embodiments and the modified examples described above are illustrative only, and the present disclosure is not limited to the embodiments and the modified examples. For example, it is also possible to arbitrarily combine any of the embodiments and the modified examples with each other.

The present disclosure includes configurations (e.g., configurations having the same function, the same way, and the same result, or configurations having the same object and the same advantage) substantially the same as the configuration described as the embodiment. Further, the present disclosure includes configurations obtained by replacing a non-essential part of the configuration described as the embodiment. Further, the present disclosure includes configurations providing the same functions and advantages, and configurations capable of achieving the same object as those of the configuration described as the embodiment. Further, the present disclosure includes configurations obtained by adding known technologies to the configuration described as the embodiment.

The following contents derive from the embodiments and the modified examples described above.

A physical quantity detection circuit according to an aspect of the present disclosure includes a first chopping circuit to which a first differential signal based on an output signal of a physical quantity detection element is input, an operational amplifier configured to perform differential amplification on a second differential signal input from the first chopping circuit via a first signal path and a second signal path, a second chopping circuit to which a third differential signal based on an output signal of the operational amplifier is input, an analog/digital conversion circuit configured to convert a fourth differential signal based on an output signal of the second chopping circuit into a digital signal, and a capacitance circuit coupled to the first signal path and the second signal path.

In this physical quantity detection circuit, the signal component around the DC component included in the first differential signal input to the first chopping circuit is converted by the first chopping circuit into a signal component around the chopping frequency. Further, the signal component around the chopping frequency included in the third differential signal input to the second chopping circuit is converted into the signal component around the DC component. Further, the signal component around the DC component included in the third differential signal is converted by the second chopping circuit into the signal component around the chopping frequency. As a result, in the output signal of the second chopping circuit, the 1/f noise generated in the operational amplifier is effectively reduced. Further, in this physical quantity detection circuit, it is possible for the capacitance circuit to reduce the overshoot which occurs when the polarity of the second differential signal flips due to the chopping action of the first chopping circuit, and thus, it is possible to converge the ringing caused by the overshoot in a short time. Therefore, the analog/digital conversion circuit is hardly affected by the ringing when sampling the fourth differential signal, the error in the digital signal decreases, and the sensitivity linearity error is reduced. Therefore, according to this physical quantity detection circuit, it is possible to reduce the 1/f noise generated by the operation of the operational amplifier, and at the same time, reduce the sensitivity linearity error.

In the physical quantity detection circuit according to the aspect described above, the capacitance circuit may include a capacitive element, and one end of the capacitive element may be coupled to the first signal path, and another end of the capacitive element may be coupled to the second signal path.

In this physical quantity detection circuit, the ringing occurring in the signal propagating through the first signal path and the ringing occurring in the signal propagating through the second signal path which are at least partially reversed in phase from each other are canceled out by the capacitive element, and thus, it is possible to converge the ringing in a shorter time. Therefore, according to this physical quantity detection circuit, the sensitivity linearity error is reduced, or it is possible to widen the signal band by increasing the sampling frequency of the analog/digital conversion circuit.

In the physical quantity detection circuit according to the aspect described above, the capacitance circuit may include a first capacitive element and a second capacitive element, the first capacitive element may be coupled to the first signal path in one end, and may be supplied with a constant voltage in another end, and the second capacitive element may be coupled to the second signal path in one end, and may be supplied with the constant voltage in another end.

In this physical quantity detection circuit, the ringing occurring in the signal propagating through the first signal path and the ringing occurring in the signal propagating through the second signal path which are at least partially reversed in phase from each other are canceled out by the first capacitive element and the second capacitive element, and thus, it is possible to converge the ringing in a shorter time. Therefore, according to this physical quantity detection circuit, the sensitivity linearity error is reduced, or it is possible to widen the signal band by increasing the sampling frequency of the analog/digital conversion circuit.

A physical quantity detection device according to an aspect of the present disclosure includes the physical quantity detection circuit according to the aspect described above, and the physical quantity detection element.

According to this physical quantity detection device, since there is provided the physical quantity detection circuit capable of reducing the 1/f noise generated by the operation of the operational amplifier, and at the same time, reducing the sensitivity linearity error, it is possible to achieve a high reliability.

What is claimed is:

1. A physical quantity detection circuit comprising:
 a first chopping circuit to which a first differential signal based on an output signal of a physical quantity detection element is input;
 an operational amplifier configured to perform differential amplification on a second differential signal input from the first chopping circuit via a first signal path and a second signal path;
 a second chopping circuit to which a third differential signal based on an output signal of the operational amplifier is input;

an analog/digital conversion circuit configured to convert a fourth differential signal based on an output signal of the second chopping circuit into a digital signal; and a capacitance circuit coupled to the first signal path and the second signal path.

2. The physical quantity detection circuit according to claim 1, wherein the capacitance circuit includes a capacitive element, and one end of the capacitive element is coupled to the first signal path, and another end of the capacitive element is coupled to the second signal path.

3. The physical quantity detection circuit according to claim 1, wherein the capacitance circuit includes a first capacitive element and a second capacitive element, the first capacitive element is coupled to the first signal path in one end, and is supplied with a constant voltage in another end, and the second capacitive element is coupled to the second signal path in one end, and is supplied with the constant voltage in another end.

4. A physical quantity detection device comprising:

the physical quantity detection circuit according to claim 1; and the physical quantity detection element.

* * * * *